(12) United States Patent
Rangelov et al.

(10) Patent No.: US 10,971,940 B2
(45) Date of Patent: Apr. 6, 2021

(54) BATTERY LONGEVITY EXTENSION

(71) Applicant: International Power Supply AD, Sofia (BG)

(72) Inventors: Alexander Stoilov Rangelov, Sofia (BG); Filip Stoilov Rangelov, Sofia (BG); Kiril Todorov Marinov, Sofia (BG); Stoil Rangelov Trifonov, Sofia (BG)

(73) Assignee: International Power Supply AD, Sofia (BG)

( * ) Notice: Subject to any disclaimer, the term of this patent is extended or adjusted under 35 U.S.C. 154(b) by 115 days.

(21) Appl. No.: 16/196,906

(22) Filed: Nov. 20, 2018

(65) Prior Publication Data

US 2020/0161880 A1 May 21, 2020

(51) Int. Cl.
*H02J 7/00* (2006.01)
*H02J 7/34* (2006.01)
(Continued)

(52) U.S. Cl.
CPC ....... *H02J 7/0022* (2013.01); *H01M 10/0525* (2013.01); *H01M 10/06* (2013.01); *H01M 10/441* (2013.01); *H02J 7/342* (2020.01)

(58) Field of Classification Search
CPC ......... Y02E 60/12; H02J 7/0068; H02J 7/022; H02J 7/0031; H01M 10/44
See application file for complete search history.

(56) References Cited

U.S. PATENT DOCUMENTS

2010/0019729 A1* 1/2010 Kaita ...................... B60L 50/61
320/134
2014/0239908 A1* 8/2014 Ichikawa .............. H02J 7/0016
320/134
(Continued)

FOREIGN PATENT DOCUMENTS

CN 107979125 A 5/2018
EP 2930821 A1 10/2015
EP 3451478 A1 3/2019

OTHER PUBLICATIONS

Written Opinion and International Search Report from International Application No. PCT/IB2019/059758, dated Jan. 16, 2020, 14 pages.

*Primary Examiner* — Arun C Williams
(74) *Attorney, Agent, or Firm* — Sterne, Kessler, Goldstein & Fox

(57) ABSTRACT

Disclosed herein are system, method, and computer program product (computer readable medium) embodiments for extending battery longevity by improving partial-state-of-charge operation of batteries. An embodiment operates by determining, using at least one processor, that at least one first battery has stopped charging at a partial state of charge, in which the at least one first battery is associated with a first battery bank and is rechargeable, and charging, in response to receipt of a command issued from the at least one processor or another processor in response to the determining, the at least one first battery using at least one second battery, in which the at least one second battery belongs to a second battery bank that is not the first battery bank, by transferring charge from the at least one second battery to the at least one first battery.

27 Claims, 7 Drawing Sheets

(51) Int. Cl.
    *H01M 10/0525*     (2010.01)
    *H01M 10/06*     (2006.01)
    *H01M 10/44*     (2006.01)

(56) References Cited

U.S. PATENT DOCUMENTS

2018/0331397 A1* 11/2018 Yamaai .................... H02J 7/34
2019/0148964 A1* 5/2019 Fasching ........... H02J 7/007182
                                                                 320/139

\* cited by examiner

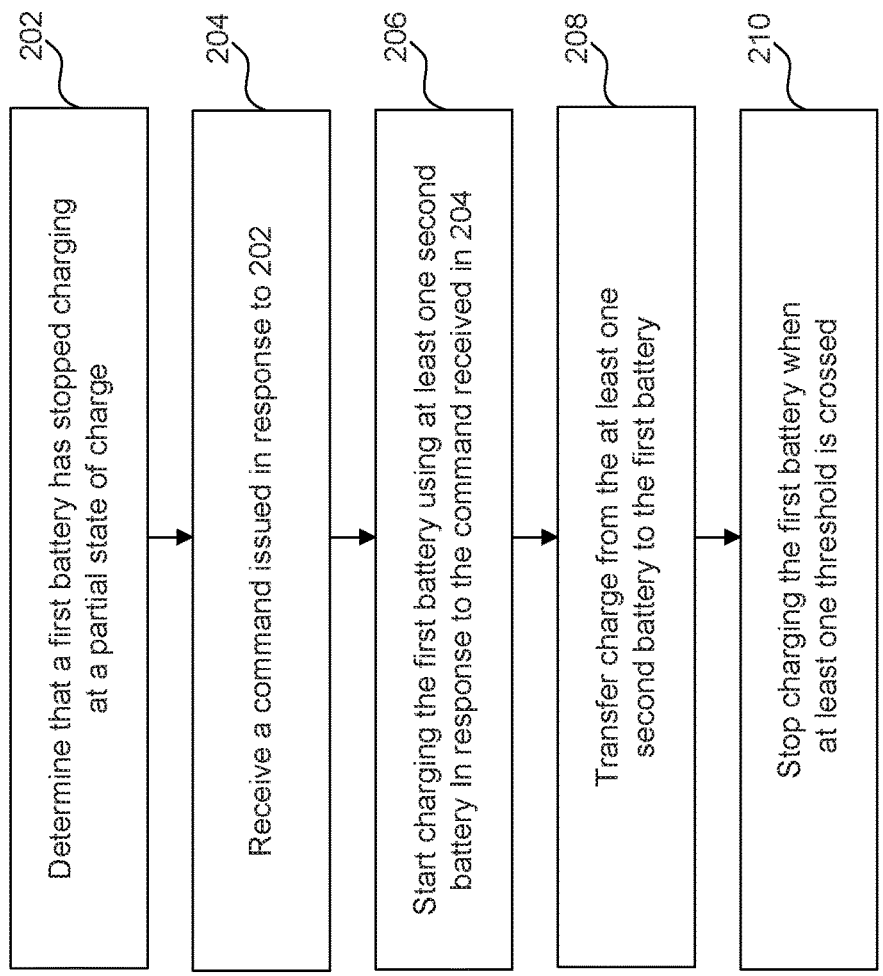

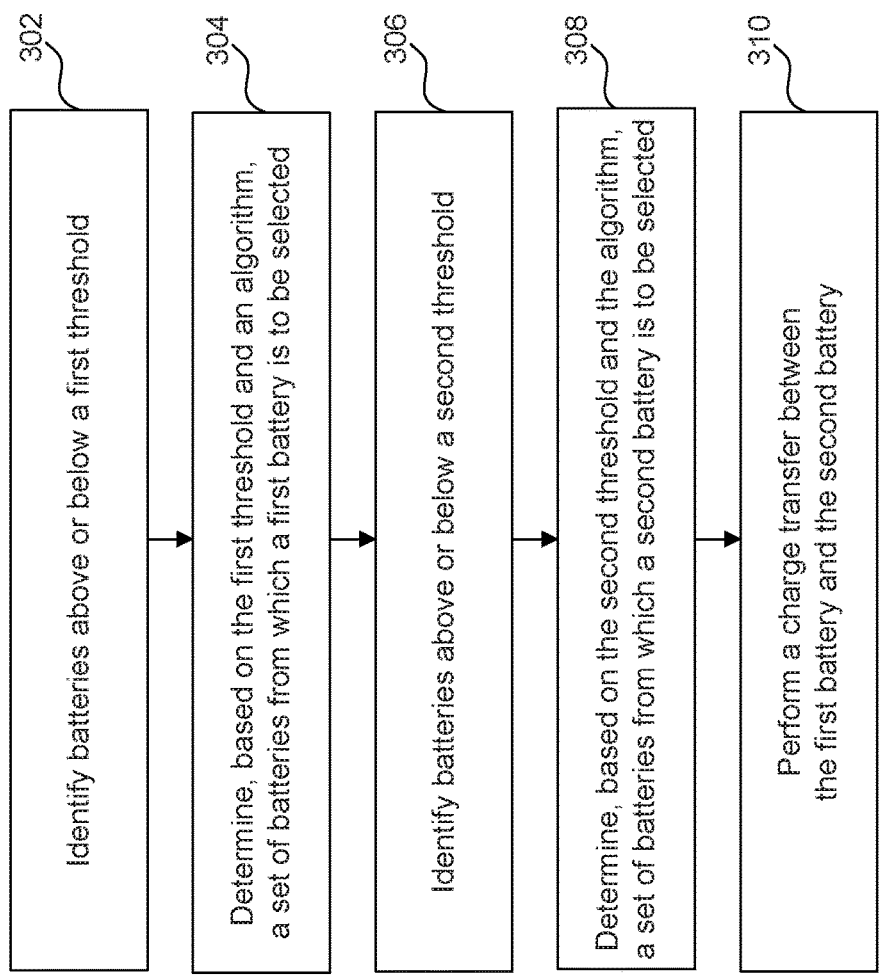

BATTERY LONGEVITY EXTENSION

BACKGROUND

Sustainably deriving usable electrical power from renewable energy sources can pose critical challenges to long-term viability of environmentally friendly sustainable energy options for generating electrical power. Such problems are especially troublesome in off-grid applications in which renewable energy sources are used in a primary capacity rather than simply as a supplement or backup energy source. As many renewable energy sources cannot provide a steady stream of energy under typical operating conditions, it becomes necessary to use devices to store electrical charge for enough time to meet power demands when renewable sources (or any other sources) are unavailable.

One obstacle to realizing inexpensive sustainable energy is shortened lifetimes of the devices used for storing electrical charge. In many typical use cases, electrical storage batteries may be used to store electrical charge in conjunction with renewable energy sources that may not be constantly available for power generation. Certain batteries may be able to store enough charge for enough time to meet power demands in a temporary absence of an energy source to power the loads of the power demands and recharge the batteries. However, problems may arise over time, when prolonged use of the batteries across multiple cycles of discharging and recharging eventually render batteries unable to store much electrical charge.

Although this type of wear is inevitable with prolonged use of batteries, such wear may be accelerated when charge-discharge cycles continue without fully recharging the batteries, often operating the batteries in a partial state of charge. As a result, such partial-state-of-charge (PSoC) operation can significantly reduce battery longevity overall. Reduced longevity of batteries may thus lead to more frequent repair and/or replacement of the batteries, other maintenance of separate components that may depend on the batteries, and/or use of backup generators relying on non-sustainable energy sources to make up for any shortfall. This increased maintenance overhead in turn increases operating expenses and total cost of ownership of sustainable energy systems, imposing barriers to reliable adoption of sustainable energy, as well as creating greater environmental side-effects.

SUMMARY

Provided herein are examples of system, apparatus, article of manufacture, method, and/or computer program product embodiments, and/or combinations and sub-combinations thereof, for battery longevity extension.

In some embodiments, a computer-implemented method can involve determining, using at least one processor, that at least one first battery has stopped charging at a partial state of charge, in which the at least one first battery is associated with a first battery bank and is rechargeable, and charging, in response to receipt of a command issued from the at least one processor or another processor in response to the determining, the at least one first battery using at least one second battery. The at least one second battery belongs to a second battery bank that is not the first battery bank. Charge can thereby be transferred from the at least one second battery to the at least one first battery.

In another embodiment, a battery management system can include a memory and at least one processor, which may be coupled to the memory and configured to perform operations of determining, using the at least one processor, that at least one first battery has stopped charging at a partial state of charge, in which the at least one first battery is associated with a first battery bank and is rechargeable, and charging, in response to receipt of a command issued from the at least one processor or another processor in response to the determining, the at least one first battery using at least one second battery. The at least one second battery belongs to a second battery bank that is not the first battery bank. Charge can thereby be transferred from the at least one second battery to the at least one first battery.

In a further embodiment, a computer-readable storage device can have instructions stored thereon that may cause at least one processor to perform instructions such as determining, using the at least one processor, that at least one first battery has stopped charging at a partial state of charge, in which the at least one first battery is associated with a first battery bank and is rechargeable, and charging, in response to receipt of a command issued from the at least one processor or another processor in response to the determining, the at least one first battery using at least one second battery. The at least one second battery belongs to a second battery bank that is not the first battery bank. Charge can thereby transferred from the at least one second battery to the at least one first battery.

It is to be appreciated that the Detailed Description section below, not the Summary or Abstract sections, is intended to be used to interpret the claims. The Summary and Abstract sections may set forth one or more, but not all, exemplary embodiments of the enhanced battery management techniques described herein for battery longevity extension, and therefore are not intended to limit the appended claims in any way.

Other systems, methods, features, and advantages of the enhanced techniques disclosed herein will be, or will become, apparent to one with skill in the art upon examination of the following detailed description and corresponding drawings filed herewith. It is intended that all such additional systems, methods, features, and advantages be included within this description, and be protected by the following claims.

BRIEF DESCRIPTION OF THE DRAWINGS

The accompanying drawings are incorporated herein and form a part of the specification.

FIG. 2 is a flowchart illustrating a process or method for extending battery longevity, according to some embodiments.

FIG. 3 is a flowchart for a method 300 for selecting at least one donor battery bank from at any battery bank of a plurality of battery banks, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1A:
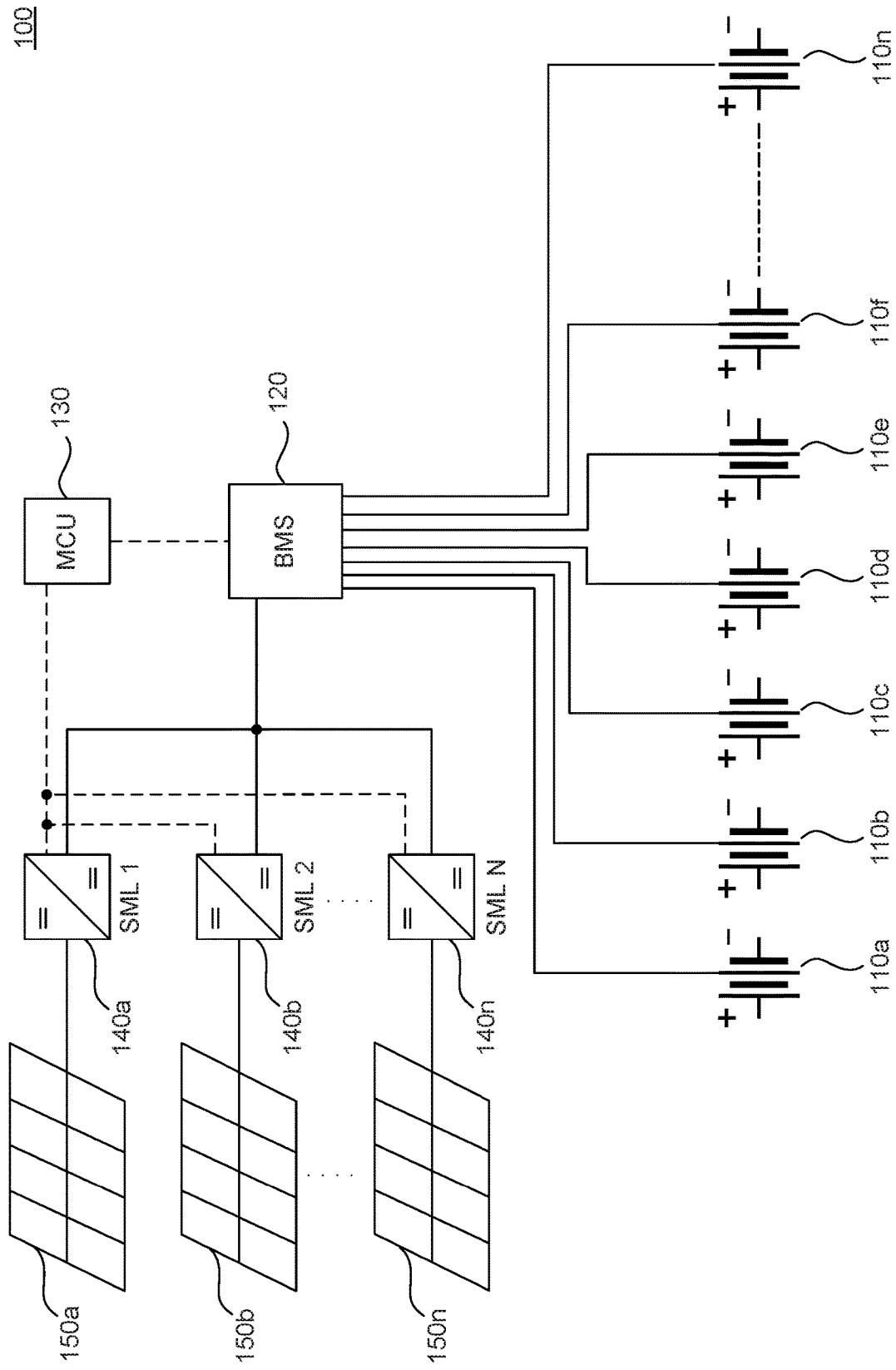
FIGS. 1A-1D are diagrams of system configurations including energy converters to generate electrical power, according to some embodiments.

Provided herein are system, apparatus, device, method and/or computer program product embodiments, and/or combinations and sub-combinations thereof, for extending battery longevity by improving partial-state-of-charge (PSoC) operation of batteries.

More specifically, in order to improve PSoC operation of batteries, many batteries require, periodically or at least every so often, that a battery reach a full state of charge (FSoC). In some embodiments, FSoC may be a predetermined amount of charge or ratio of actual charge to full capacity, for example, 80% of capacity, 97.5% of capacity, 100% of capacity, etc., depending on battery specifications. Battery capacity may be defined as originally designed capacity for electric charge or actual available capacity for electric charge, in some embodiments.

Additionally, according to some embodiments, monitoring and systematically controlling state of discharge may also be helpful to improve longevity in certain types of batteries. For example, with some batteries, deep discharge to below a certain threshold, e.g., 20% of capacity, 5% of capacity, etc., before recharging to a predetermined state of charge, may reduce overall wear on the batteries over time.

Enhanced battery management techniques may be implemented, systematically controlling cycles of charge and/or discharge, in order to improve overall battery longevity over the course of prolonged use. Use cases in which such enhanced battery management techniques may show especially significant improvement in battery longevity are in systems where batteries are used for maintaining a steady supply of power from renewable energy sources that may have significant variations in availability over certain periods of time.

For purposes of this disclosure, such renewable energy sources that may have significant variations in availability over certain periods of time may also be referred to as unreliable energy sources. Examples of unreliable energy sources include, but are not limited to, solar, wind, wave, tide, and geothermal energy sources, in some embodiments, which may be converted to electrical power by way of photovoltaic cells, turbines, wave/tidal energy converters, and various other conversion devices. Unreliable energy sources may also be characterized by their likelihoods of having a converted power supply be interrupted or degraded for prolonged periods of time between periods of acceptable or peak power output.

For example, even under ideal weather conditions, solar power generation may be periodically interrupted during night times when solar energy becomes regularly unavailable. Depending on terrestrial latitudes, these nighttime periods of interrupted solar power may be longer or shorter seasonally. Even during daytime hours when solar energy may be available, various weather phenomena may reduce availability of solar energy, in turn degrading solar power output. Tidal energy sources may also incur periodic fluctuations and one-off variations similar to those of solar energy. For other examples of unreliable energy sources, wind power and wave power may be subject to longer periods of degradation or interruption from energy sources being unavailable.

In the presence of reliable energy sources, such as grids connected to power plants burning fossil fuels, hydroelectric dams, nuclear power plants, etc., where unavailability is a rare exception to normal operation, managing battery charge to improve longevity may be straightforward. By contrast, in the absence of reliable energy sources, problems with maintaining acceptable levels of battery longevity have typically posed significant challenges to adoption of sustainable power generation that relies on sustainable but unreliable energy sources, as further described herein. As a result of enhanced battery management techniques disclosed herein, battery longevity may be significantly improved. These such advantages and other advantages of these enhanced techniques will be readily appreciated by persons having ordinary skill in the related arts.

With respect to some embodiments that rely on solar energy as a renewable resource for power generation, a problem to be solved may be that a daily amount of solar irradiance is not sufficient to charge a battery to its FSoC daily for a given photovoltaic cell or array of photovoltaic cells (PV array). To enumerate for a particular non-limiting example, under ideal weather conditions for a particular place and season, daily solar irradiance may allow for seven hours of charging time.

However, depending on specifications of a given battery and a corresponding PV array, this same combination of battery and PV array may require, e.g., twelve hours of charging time to return to the given battery's FSoC, in this particular example embodiment. Thus, without taking further measures, continued use of this battery and PV array would result in a prolonged run of PSoC operation. In some scenarios, the battery's stored charge may become fully depleted. But even if this prolonged PSoC operation does not fully deplete the battery's charge, such prolonged PSoC operation may lead to wear, decreasing capacity over time and thereby shortening effective useful longevity of the given battery, according to some embodiments.

For many types of batteries, simply avoiding this continued PSoC operation over prolonged periods may be sufficient to avoid most if not all of the wear described above. One way to allow for avoiding PSoC operation would be to have a given battery connected to a reliable power grid or another reliable generator that may make use of non-renewable energy source(s), for example. However, this would defeat the purpose of sustainable power generation in some cases, and reliable power such as this may not even be an option in many settings.

Thus, when off-grid and/or using a self-sufficient solution for renewable generation of electric power, multiple batteries may be included within the same off-grid system or self-sufficient system. Another battery or batteries of the multiple batteries thus may be further used for topping off a given battery to FSoC. Implementations of such topping-off techniques may involve one or more specific algorithms tuned to improve performance of at least one battery management system (BMS) associated with the given battery, and/or to improve performance of the corresponding system's batteries themselves, including via wear reduction, and any capacity preservation and/or longevity extension that may result from such techniques or from such wear reduction, according to some embodiments. While this paragraph provides some high-level descriptions at a conceptual level, additional details and non-limiting example embodiments are further described below.

For purposes of this disclosure, a battery may be any device designed to store or otherwise capable of storing electrical energy, such as by storing electric charge or converting electricity into a physical or chemical format that may be stored. Other non-limiting examples may include accumulators, alternators, capacitors, flywheels, springs, etc. Additionally, for purposes of this disclosure, electrical energy storage may be referred to as storing electrical charge, transferring electrical charge, charging, recharging, etc., as high-level descriptions that may or may not be indicative of underlying physical and/or chemical phenomena for a particular type of energy storage, but which nonetheless are terms that will be conceptually understood by persons having ordinary skill in the art related to electrical energy storage and generation, batteries, and related technologies.

Practical implementations of batteries may be realized in a variety of forms. For example, any battery of the plurality of batteries 110 can include a lead-acid battery, lithium-ion battery, sodium-ion battery, potassium-ion battery, nickel-based battery, polymer-based battery, polysulfide bromide battery, silver-oxide battery, metal-air battery, silicon-air battery, glass battery, vanadium redox battery, vanadium flow battery, organic radical battery, and rechargeable fuel cell, to name a few non-limiting examples.

These types of batteries may in fact be broader categories to which various sub-types of batteries belong. For example, a lithium-ion battery may more specifically refer to lithium ferrophosphate battery, lithium cobalt oxide battery, lithium-sulfur battery, etc., while a sodium-ion battery may refer to a sodium cobalt oxide battery, sodium ferrophosphate battery, etc., without departing from the scope of this disclosure.

FIGS. 1A-1D are diagrams of system configurations including energy converters to generate electrical power at least one renewable energy source, at least one battery management system, and a plurality of batteries in different battery bank arrangements, according to some embodiments. In the examples depicted here, PV arrays are shown as the energy converters in these particular embodiments. Other embodiments may include any type of energy sources, converters, generators, or other readily usable power sources, regardless of whether or not they are reliable or sustainable.

FIG. 1A shows one example of base components for implementation of enhanced battery management techniques described herein. In this embodiment, a plurality of batteries is shown (collectively "batteries 110"), with individual batteries having corresponding reference numbers beginning with 110 and ending with a letter in sequence. As a practical matter, at least two batteries would be needed, and any greater number (n) of batteries may be used.

Each battery (e.g., 110a, 110b, . . . 110n, with n representing any number ending a sequential listing of batteries) of the plurality of batteries 110 can be connected to at least one battery management system (BMS) 120 and/or at least one microcontroller unit (MCU) 130, which may be in communication with any of the batteries directly or via any other component of BMS 120. Each battery may be directly connected to BMS 120 and/or MCU 130, such as in the example depicted in FIG. 1A. Additionally, or alternatively, any of the batteries 110 can be interconnected, in various formats (not shown), including daisy chain, daisy wheel or hub and spokes, or any other micro-grid or network-type interconnection topology, for example, in some embodiments.

BMS 120 and/or MCU 130 can interface directly or indirectly with any number of charge controllers 140 for any number of energy converters 150. Each charge controller (e.g., 140a, 140b, . . . 140n, with n representing any number ending a sequential listing of charge controllers) may be connected to any number of energy converters 150. Each energy converter e.g., 150a, 150b, . . . 150n, with n representing any number ending a sequential listing of charge controllers) and/or each charge controller 140 can be directly connected to a corresponding MCU 130 and/or BMS 120, and/or may be multiplexed via any number of hub or switch configurations. Additionally, or alternatively, charge controllers 140 and/or energy converters 150 can be interconnected in any micro-grid or network-type topology.

In some embodiments (not depicted), charge controllers 140 and/or MCU 130 can be incorporated into BMS 120, and energy converters 150 can be directly connected to BMS 120, such as in an integral and/or modular format. Similarly, in some embodiments (not depicted), any of the batteries 110 can be an integral or modular component of BMS. In similar fashion, MCU 130 instances or components thereof may be distributed as a part of each charge controller 140 and/or each battery 110. In some embodiments, charge controllers 140 can be integrated or modularized components of energy converters 150, for example.

Although the energy converters shown here are depicted as PV arrays, such as layouts of solar cells, any type of energy converter may be used. Other examples may include various types of turbines, dynamos, wave energy converters, tidal energy converters, etc. The types of energy converters 150 may or may not be the same across the implementation depicted in this example 100 of FIG. 1A. For example, any combination of energy converters may be used, such as PV arrays and wind turbines together. Additionally, or alternatively, any of the energy converters 150 can be replaced with another readily usable power source, such as an engine generator, or a connection to a separate power grid (not shown), in some embodiments.

Figure 1B:
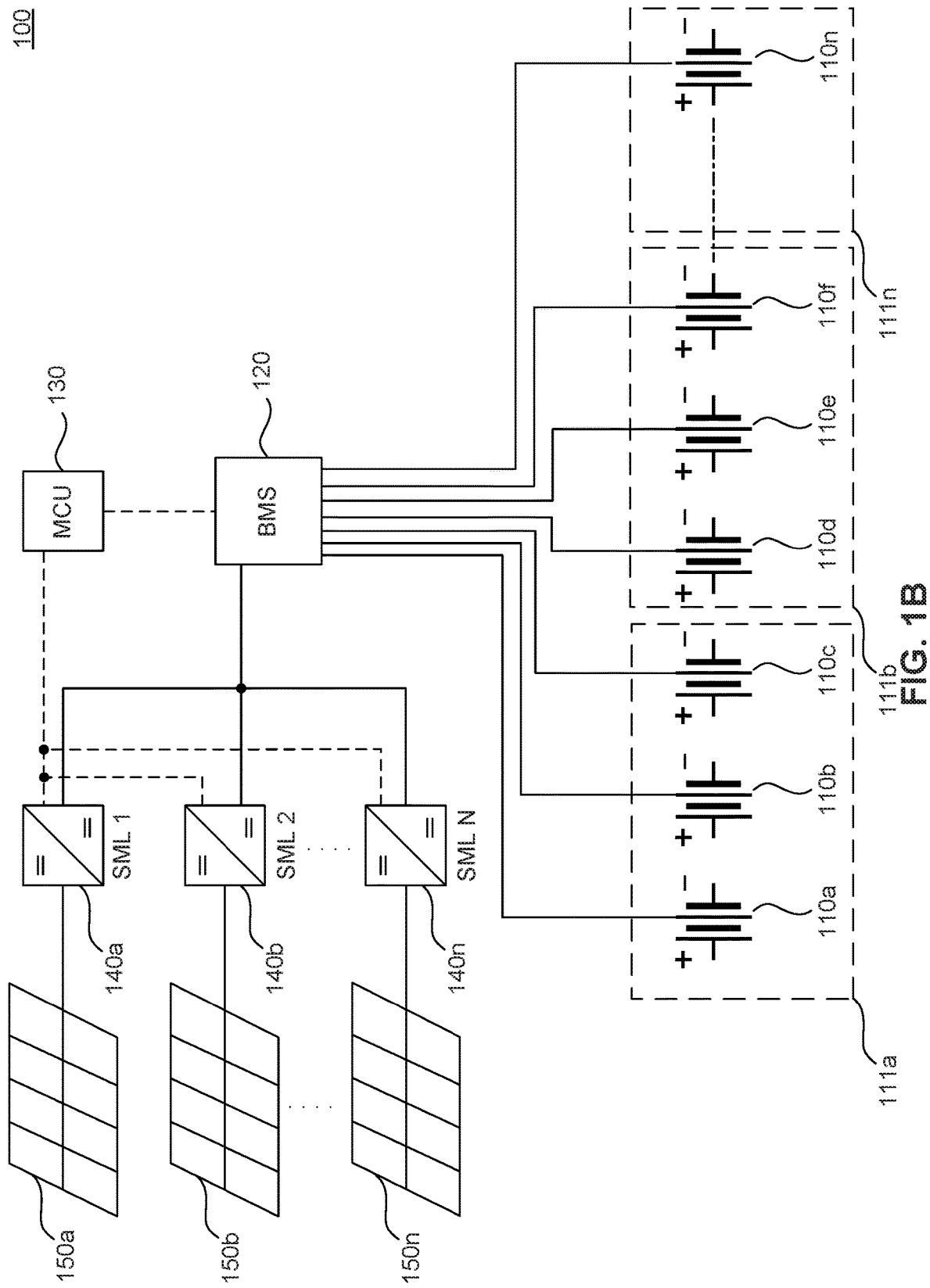

FIG. 1B is a diagram illustrating groupings of batteries 110 into battery banks 111.

Each battery bank (e.g., 111a, 111b, . . . 111n, with n representing any number ending a sequential listing of battery banks). In the one particular example depicted in FIG. 1B, not to be construed as limiting in any way, battery bank 111a includes batteries 110a, 110b, and 110c, for example, and battery bank 111b includes batteries 110d, 110e, and 110f, in this non-limiting example embodiment. The last battery bank 111n can include the last batteries up to 110n. In some embodiments, batteries may be added, removed, and replaced.

With such changes in battery configuration, in some embodiments, definitions of which battery may belong to which battery bank(s) may be redefined, for example. In some embodiments, battery banks may be tightly grouped and/or physically interconnected within a battery bank in a different manner from how battery banks may be connected to other battery banks and/or to BMS 120, for example. Additionally, or alternatively, battery banks may be arbitrarily and/or loosely defined, such as grouping together batteries with similar characteristics, capacities, run times, wear profiles, etc.

Figure 1C:
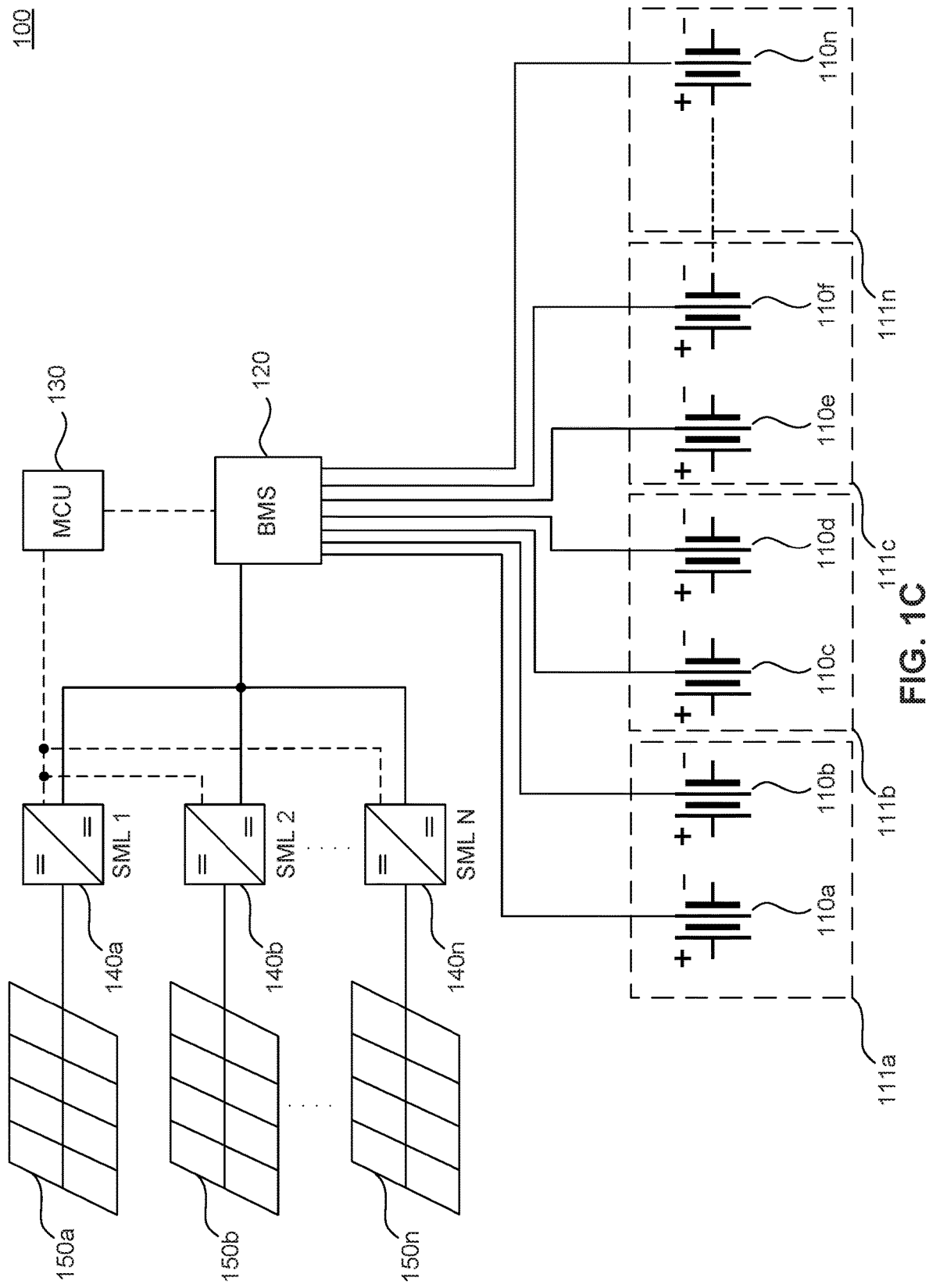

FIG. 1C is a diagram illustrating different groupings of batteries 110 into different battery banks 111. In the one particular example depicted in FIG. 1C, not to be construed as limiting in any way, battery bank 111a includes batteries 110a and 110b, battery bank 111b includes batteries 110c and 110d, and battery bank 111c includes batteries 110e and 110f, for example. In similar fashion as with FIG. 1B, the last battery bank 111n can include the last batteries up to 110n. In some embodiments, batteries may be added, removed, and replaced. With such changes in battery configuration, in some embodiments, definitions of which battery may belong to which battery bank(s) may be redefined, for example.

Unlike the examples of FIGS. 1B and 1C, the distribution of batteries in battery banks is not necessarily uniform. In some embodiments, it is not necessary to have the same number of batteries in each battery bank. This further allows for any number of batteries in redundant systems, further facilitating addition, removal, and/or replacement of batteries.

Figure 1D:
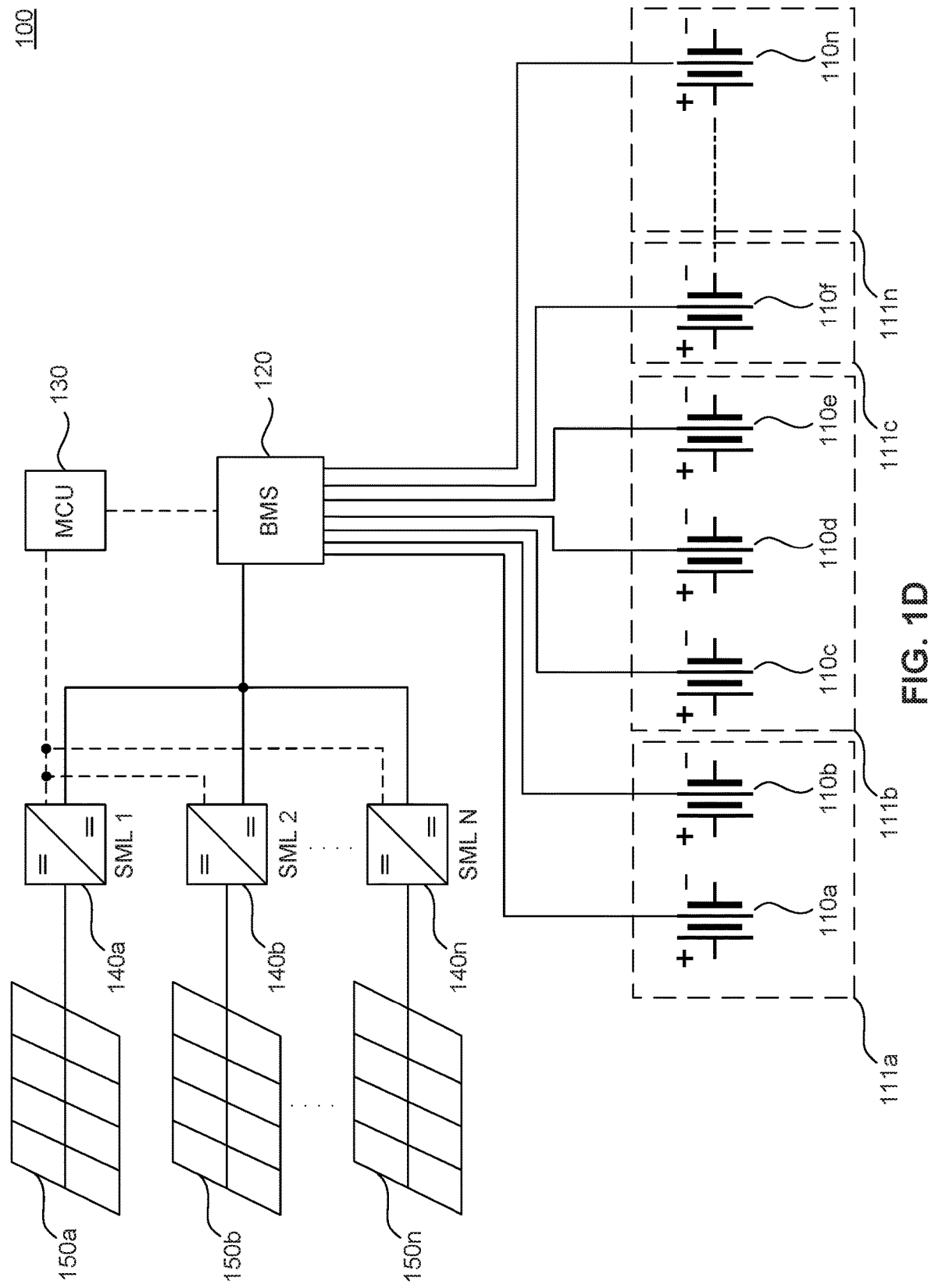

FIG. 1D shows an example of an implementation having non-uniform distribution of batteries in battery banks. In the one particular example depicted in FIG. 1C, not to be construed as limiting in any way, battery bank 111a includes batteries 110a and 110b, battery bank 111b includes batteries 110c, 110d, and 110e, and battery bank 111c includes battery 110f, for example. In some embodiments, a given battery bank may include only one battery. Depending on how battery banks 111 and enhanced battery management techniques may be implemented, a battery bank with only one battery may allow for the included battery to be recharged from other banks. In some other embodiments, a single-battery battery bank may be taken offline for maintenance or operated in a degraded state without enhanced battery management techniques, in some non-limiting examples.

The exemplary embodiments, arrangements, and configurations depicted in FIGS. 1A-1D are not intended in any way to be limiting characterizations of the scope of the claims submitted herewith, but rather to describe by way of example the variety and flexibility of possible configurations with which the enhanced battery management techniques described herein may be implemented. Non-limiting examples of these enhanced techniques are further described in more detail via additional embodiments referencing figures described below.

FIG. 2 is a flowchart illustrating a process or method for extending battery longevity by improving PSoC operation of batteries in battery banks to reduce wear on the batteries, according to some embodiments.

The flowchart of FIG. 2 depicts a method 200 for extending battery longevity, according to some embodiments. Method 200 can be performed by processing logic that may comprise hardware (e.g., circuitry, dedicated logic, programmable logic, microcode, etc.), software (e.g., instructions executing on a processing device), or a combination thereof It is to be appreciated that not all steps may be needed to perform the enhanced techniques of the disclosure provided herein. Further, some of the steps may be performed simultaneously, or in a different order from that shown in FIG. 2, as will be understood by a person of ordinary skill in the art.

Method 200 shall be described with reference to any of FIGS. 1B-1D. However, method 200 is not limited to those example embodiments.

Method 200 is disclosed in the order shown above in this exemplary embodiment of FIG. 2. In practice, however, the operations disclosed above, alongside other operations, may be executed sequentially in any order, or they may alternatively be executed concurrently, with more than one operation being performed simultaneously, or any combination of the above. Additionally or alternatively, any simultaneous, concurrent, or sequential operations may be performed simultaneously, concurrently, and/or sequentially, and independently of or dependently on any other operation(s) that may be running elsewhere, for example.

In 202, it may be determined that a first battery has stopped charging at a PSoC. This determination may be performed by a processor, for example, of MCU 130, or by another element in BMS 120, in some embodiments. The first battery may be any battery of the plurality of batteries 110. Such a determination may be made, for example, by monitoring sensors in or connected to the first battery. Such sensors may sense any of voltage, current, charge, temperature, chemical emissions, or any combination thereof, pertaining to the first battery, to name a few non-limiting examples.

Additionally, or alternatively, such sensors may measure and/or calculate parameters pertaining to any of a particular charge controller 140, energy converter 150, or actual renewable energy source (not shown). In a case of solar energy, for example, solar irradiance may be measured, along with other factors that may affect solar irradiance and/or energy conversion, so that charge and/or charging activity may be calculated indirectly, without necessarily monitoring a battery directly, in some embodiments.

In some embodiments, such as that shown in 202 of method 200, the determination includes both that the first battery has stopped charging (e.g., is not presently charging or otherwise increasing its stored energy), and that the first battery is in a PSoC, not FSoC, or not otherwise at a state or level of charge that would allow for improved longevity over PSoC operation, for example. Stopping or not charging at FSoC may be safe to reduce wear, and charging while in PSoC may also be expected in healthy operation to get to FSoC.

However, in some embodiments, even if the first battery is charging while in a PSoC, some implementations may further determine a rate of charging; if the rate of charge is below a threshold rate of charging, then this may still yield a determination that the battery has stopped charging or is otherwise effectively not charging. In some embodiments, other determinations may be included and/or disregarded.

In 204, a command may be issued by a processor in response to the determining of 202, and the command may then be received by the same processor or a different processor in or coupled do BMS 120, for example. The issuing and/or receiving processors may be any of the at least one microcontroller unit of MCU 130, any component of BMS 120, and/or any processor module or integral component coupled with any of the batteries 110, charge controllers 140, or energy converters 150, for example. The command may be a command including instructions to take further measurements, make further determinations, and/or start charging the first battery, in some embodiments.

In 206, charging may begin in response to any part of the command referenced in 204 above. The charging may be of the first battery by at least one second battery. Additionally, or alternatively, in some other embodiments, the charging may be of the first battery by at least one other power source, for example, where available. More specifically, the command referenced in 204 may direct the charging, specifically identifying the first battery as a battery to receive charge, and/or specifically identifying which battery or batteries of the at least one second battery may "donate" charge, so as to ensure a suitable charge donor battery. The first battery may be rechargeable if it is to be charged in this manner, whereas any donor battery of the at least one second battery may or may not be rechargeable, in some embodiments.

Further, donor batteries may be selected from the at least one second battery according to battery banks 111. By grouping batteries 110 into battery banks 111, battery management may be further improved for efficiency and consistency, in some embodiments. Thus, the at least one second battery may be determined based on total statistics of batteries in at least one respective battery bank comprising the at least one second battery, and/or based on aggregated statistics for multiple battery banks 111 or all batteries 110. Similarly, the first battery may be chosen based on at least one algorithm, for example. Specific examples of some possible algorithms for choosing batteries are further described herein.

In 208, charge may be transferred from the at least one second battery to the first battery. Depending on implementation, in some embodiments, 208 can involve a distinct system state from that of 206, whereas in other embodiments, 206 can include the "transfer" of charge specified in 208. Regardless of execution state, for ease of illustration and description of additional non-limiting considerations described below, 208 is depicted separately from 206 in FIG. 2, but this separation is not intended to be limiting in any way.

Transfer of charge may be regulated by at least one regulator of electrical power, current, and/or voltage, which may additionally be subject to dynamic control. The dynamic control may be performed by at least one processor including but not limited to any part of BMS 120, MCU 130, or any modular or integral component of any regulator of the at least one regulator. The dynamic control may additionally or alternatively be performed manually by an operator. In the case of automatic dynamic control, such dynamic control may be performed in response to environmental conditions and/or operating conditions of the batteries 110, BMS 120, MCU 130, charge controllers 140, and/or energy converters 150, among other possible factors, to name a few non-limiting examples.

In 210, the charging of the first battery may be stopped when at least one threshold is crossed. The at least one threshold may include a first threshold, which may pertain to power input from an external power source, including any of charge controllers 140, energy converters 150, and/or any other readily usable power source (not shown). The at least one threshold may additionally or alternatively include a second threshold that may pertain to discharge load on any battery of the plurality of batteries 110, including the at least one second battery used for charging the first battery, in some embodiments. The stopping of the charging (i.e., stopping the transfer of charge) may be performed in response to a command issued in response to a determination of a threshold being crossed, in some embodiments. In some embodiments, batteries may be designed or configured to stop charging automatically, without processor control or instructions, upon satisfaction of certain physical conditions.

For example, charging may be additionally stopped when the first battery reaches its FSoC. Charging can also be stopped when a rate of charge or discharge of any battery of the batteries 110 exceeds a predetermined (dis)charge rate threshold, or when a level of measured electrical current exceeds a predetermined current threshold, to name a few non-limiting examples. While these thresholds may be enforced with sensor measurement(s) and processor instruction(s), others may be enforced by design, e.g., circuit design including fuses, which may ensure that current does not exceed a certain level, even without active measurement, regulation (e.g., voltage regulation, current regulation, overall power regulation, etc.), or processor commands or instructions, for example, in some embodiments.

Additionally, measured values for threshold comparisons may involve multiple calculations before or during comparison to their respective thresholds. For example, thresholds may be for a predetermined value of charge, a predetermined percentage of capacity of the at least one first battery, a predetermined value of load, a predetermined load-to-charge ratio of the at least one second battery, and/or an estimated discharge time of the at least one second battery, to name a few non-limiting examples. Further, in some embodiments, thresholds may be dynamically adjusted, such as based on a charge level of a battery of the plurality of batteries 110.

Regarding which batteries are selected for charging or discharging, selections can be made in such situations as when a different battery or battery bank needs to be charged and/or when a different battery or battery bank is determined to be best suited to provide charge to another battery or battery bank, for example, compared to another battery or battery bank that may have been providing charge up to the time of the selection. Such determination for selection may be performed programmatically by at least one processor, such as in a case where a suitable battery or battery bank is automatically decided according to an algorithm implemented in a BMS, in some embodiments. Thus, a selected battery bank can be selected to be a donor battery bank or a recipient battery bank, depending on parameters pertaining to available battery banks including the selected battery bank.

In an embodiment, selecting a selected battery bank from at least a first battery bank and a second battery bank, for example. In other embodiments, the selected battery bank can be selected from at least a first battery bank, a second battery bank, and a third battery bank. Generally, the selected battery bank can be a battery bank selected from any number of battery banks, depending on how the selection is made. Similarly, selection of batteries may be performed, such as within a selected battery bank, or in other embodiments, independently of which battery bank the battery may belong to, for example. Any of the battery banks may be rechargeable. Donor battery banks may or may not be rechargeable in some embodiments.

When selecting a suitable battery or battery bank, the selecting may be performed according to an algorithm, in some embodiments, including at least one of a round-robin algorithm, a pseudo-random algorithm, a balancing algorithm, a statistical algorithm, a charge-based algorithm, a frequency-based algorithm, a time-based algorithm, a capacity-based algorithm, a voltage-based algorithm, or any combination thereof. Any other algorithms, operation modes, design patterns, or automated implementations, deterministic or non-deterministic, may be used for selecting which battery or battery bank may be next to give and receive charge to and from, respectively, any other battery or source of energy, for example. The following paragraphs describe a few example possibilities for some such algorithms, but these examples are not intended to be limiting.

In some embodiments, a round-robin algorithm can be used for selection, including for any combination of donor or recipient batteries or battery banks, so that they may give or receive charge to any other battery or battery bank(s) or from any other battery, battery bank, or other energy source, for example. In such cases, the round-robin algorithm is not limited to any one particular algorithm, but rather may identify a class of algorithms.

In some example embodiments, round-robin algorithms may refer to any sequential algorithms that cycle through a set of batteries or battery banks when determining a battery or battery bank that is suitable to be a donor, for example. Additionally, or alternatively, round-robin algorithms may refer to any sequential algorithms that cycle through a set of batteries or battery banks when determining a battery or battery bank that is suitable to be a recipient, for example. In the latter cases for recipient selection, selection may further depend on the source of charge, e.g., another battery or battery bank, a renewable energy source, a non-renewable energy source, etc. Thus, the an energy source (or type of energy source) may determine the set of potential recipient batteries or battery banks that a recipient selection algorithm may sequentially rotate through in a case of a round-robin algorithm, for example.

For any round-robin algorithm, in some embodiments, the set of batteries or battery banks that the round-robin algorithm rotates through may be determined by levels of charge across other batteries or battery banks available for charging or being charged, such as within a given BMS or in a wider area, such as within a region of a microgrid, for example. In this way, potential donor batteries may be selected from a set having available charge over a certain threshold. Additionally, or alternatively, potential recipient batteries may be selected from a set having available charge under another certain threshold. Such thresholds may ensure sufficient charge in donors and sufficient need in recipients, avoiding potential deficiencies and premature wear from over-discharge, and may also avoid system overhead in unnecessary switching of batteries or energy sources.

A specific example of the above algorithms may be provided with respect to battery bank selection: in a system or microgrid with ten available battery banks connected, there may be, for example, four battery banks that each have their respective batteries collectively at charge levels greater than 90%. If a threshold is set such that battery banks having less than 90% charge are not to begin, as donors, charging other batteries or battery banks, then a round-robin algorithm, according to some embodiments, may sequentially rotate donor battery banks across the four battery banks presently having at least 90% charge across all respective batteries collectively. At a more granular level, this selection may, in some embodiments, be performed with respect to individual batteries, not only battery banks.

Similarly, continuing this specific example of ten available battery banks, recipient battery banks may be selected on a round-robin basis if any battery banks have batteries of collective charge level less than 50%, on average, to name a non-limiting threshold value. Thus, if there are three battery banks each having a collective charge level of less than 50%, they each may be selected for simultaneous charging by donors, being three of the four battery banks having collective charge levels over 90%. In such an example, any donor(s) would be selected on a round-robin basis, as there are more available donors than recipients, in this embodiment.

Further continuing this specific example, in a case where recipient battery banks (e.g., each having collective charge level under 50%) outnumber potential donor battery banks, recipient battery banks can be selected according to a round-robin algorithm out of the set of available recipients (in this case, six battery banks), for any donor battery bank, or for a collective pool of donors battery banks, for example. If there is a gap in donor threshold versus recipient threshold (e.g., between 50% and 90% charge level, in this example), a BMS may handle batteries or battery banks in this range of relative charge levels by not making any designation of donor or recipient, and may avoid redistributing charge for any such battery or battery bank.

In still other embodiments, thresholds may be relative rather than absolute. For example, instead of having a donor threshold of 90% and a recipient threshold of 50%, as in this example embodiment, a difference between the charge levels of the most full and least full battery bank available may be evaluated, and if such a difference exceeds a difference threshold, then donors may be assigned based on a given margin below the charge level of the most full battery bank as a new (dynamic) donor threshold, and recipients may be assigned based on a given margin above the charge level of the least full battery bank as a new (dynamic) recipient threshold.

For example, if a critical difference range were 40% (meaning that a BMS targets ensuring that a least full battery bank has a collective charge level no more than 40% below the most full battery bank available in the same system), then thresholds may be dynamically adjusted accordingly. Thus, in the same system of ten battery banks, if the battery bank having the greatest level of charge were 74% full, for example, but the battery bank having the least level of charge were 28% full, then at least the battery bank having the most charge would be selected as a donor, and at least the battery bank having the least charge would be selected as a recipient.

Additionally, a margin may be provided, e.g., for battery banks having relative charge levels (based on total charge capacity per battery bank) within 10% of the battery bank having the most or least charge, and battery banks within these margins can thus be members of sets considered for selection with round-robin algorithms when using dynamically adjusted thresholds. Any of these thresholds may be considered part of charge-based algorithms, whether associated with round-robin selection, balancing selection, or pseudo-random selection, such as described further below.

Balancing algorithms may be used, in further embodiments. For example, instead of determining a set of batteries or battery banks, from which a battery or battery bank may be selected in round-robin fashion, balancing algorithms may pair extremes with extremes and means with means. Specifically, a battery bank having greatest relative charge collectively may be designated as a donor to give charge to a battery bank having least relative charge collectively. Similarly, this kind of donor-recipient pairing may be done for individual batteries rather than battery banks.

Balancing algorithms may also pool charge for donors and/or recipients. Thus, in some embodiments, donor battery banks may be considered as a pool for uniform discharge across donors to recipients, and/or recipients may each receive a uniform amount of charge from one or more donors. Balancing algorithms may employ other load-balancing techniques or wear-leveling techniques used with respect to batteries, charge management, or other comparable technologies. Some such techniques may further weigh time and/or frequency of charging and/or discharging.

Related to such balancing algorithms, time-based algorithms may ensure that batteries or battery banks are charging or discharging for no more or no less than a specific amount of time (time threshold). Frequency-based algorithms inversely may ensure that batteries or battery banks charge or discharge for no more or no less than certain number of occurrences within a given period of time.

For at least some batteries and/or battery banks, balancing algorithms may, additionally or alternatively, target specific thresholds by which charging is to stop, or rates of charging or discharging based on existing levels of charge for a given battery or battery bank. Thus, balancing algorithms may allow for any battery banks below a given threshold of 50% relative charge level to reach 50% charge and then stop charging. In further embodiments, balancing algorithms may allow for any battery banks below a given threshold of 50% relative charge level to reach 50% charge at the same time.

In other embodiments, depending on battery specifications and other trends across batteries or battery banks within a given BMS or microgrid, random selection of donors and/or recipients may be advantageous in some cases. For example, a given donor or recipient battery or battery bank may be selected randomly or pseudo-randomly, such as using a pseudo-random number generator. In some embodiments, additional entropy source(s) may be used to seed a random or pseudo-random number generator for battery (bank) selection.

A pseudo-random algorithm for selection, in this manner, may select a battery or battery bank at random. In some embodiments, it may be advantageous to classify available batteries or battery banks into sets of potential donors or recipients, as described above with respect to round-robin algorithms. Thus, thresholds may be used if any battery banks have batteries of collective charge level less than 50%, on average, to name a non-limiting threshold value. Thus, if there are three battery banks each having a collective charge level of less than 50%, they each may be selected for simultaneous charging by donors, being three of the four battery banks having collective charge levels over 90%. In such an example, any donor(s) would be selected on a pseudo-random basis (instead of a round-robin basis), in this embodiment, for example. Any of the above examples of dynamic thresholds, ranges, and margins may also be applied with pseudo-random algorithm selection here.

Other than round-robin algorithms, pseudo-random algorithms, and balancing algorithms, other types of methodical selection algorithms may be used to determine donors and/or recipients. Various statistical algorithms may be used, additionally or alternatively. In similar fashion as the other algorithmic schemes described above, such as for load balancing (including round-robin and pseudo-random), use of designated battery banks or batteries as donors or recipients for discharging or charging may be designed to fit statistical models.

As with the other algorithms described, some statistical models may be chosen depending on properties of batteries or battery banks available, such as how their charging, discharging, and longevity/lifecycle management may benefit from how (and how much, how frequently, and how quickly) they are charged and/or discharged. Some target statistical models include Gaussian distributions (normal distributions), Laplace distributions (double exponential distributions), Galton distributions (logarithmic normal/lognormal distributions), beta distributions, and/or gamma distributions (including chi-squared distributions and Erlang distributions), among other possible continuous probability distributions or discrete probability distributions, univariate or multivariate. These probability distributions may be with respect to any relevant parameters pertaining to batteries and/or battery banks available in a given system or microgrid, including but not limited to absolute or relative charge, wear, rate, time, frequency, cost, input/output current, power, voltage, or other factors, for example.

Another factor that may be used for determining which battery or battery bank to use as a donor or recipient may be the types of battery or batteries available to choose from, in embodiments that may include multiple types of batteries using different technologies (e.g., lead-acid batteries, nickel cadmium, etc.), according to properties of each type (rechargeable vs. nonrechargeable, fast recharge vs. slow recharge, fast discharge vs. slow discharge, etc.).

A further factor that may be considered by an algorithm for selecting batteries or battery banks for charging and discharging may be present availability or a predicted or periodic availability of an energy source (renewable or non-renewable). For example, based on availability of sunlight in combination with photovoltaic equipment to convert solar energy into a source of electric energy to charge batteries, battery charge may not need to be transferred from one battery or battery bank to another, but instead source from the available energy source, giving priority to the renewable energy source when available.

In order to avoid overhead when switching charging sources, a BMS or smart grid may be configured to predict availability of energy sources that may be periodically available and unavailable. For example, for terrestrial applications of solar energy conversion arrays, a combination of geographic or geospatial coordinates, date, time, and atmospheric conditions, may be used to determine a likelihood of an energy source becoming available within a certain time period.

Additionally, or alternatively, battery (battery bank) charge levels may be predicted within the certain time period, based, at least in part, on present status and load, and/or historical usage data. If the likelihood of an energy source becoming available within the certain time period is above a given threshold, or if the predicted battery charge levels within the certain time period are below another threshold, transfer of charge between batteries may be avoided, in some embodiments, saving potential switching overhead In further embodiments, a BMS or smart grid may be configured to give precedence to a load when available. For example, even if certain conditions are met, in which a battery or battery bank can be selected to charge another selected battery or bank to be charged, such a transfer of charge between batteries and/or battery banks can be prevented if there is a load that takes precedence. In these cases, a load may be for a power application with high priority or mission-critical designation.

In some embodiments, any load may take precedence. In other embodiments, loads may have no specific priority value by default but may be assigned a priority value manually or automatically, including by a priority algorithm, heuristic, neural network, or artificial intelligence, to provide a few non-limiting examples.

If a given load takes precedence (priority) over other loads or charge transfers, for example, then a battery-to-battery charge transfer can be prevented, which may further result in at least one potential recipient (battery or battery bank to be charged) continuing to discharge in order to supply energy for the load that takes precedence, in an embodiment. In further embodiments, recipient batteries or battery banks may be treated as loads that may or may not have a relatively high priority.

Donor batteries or battery banks may be selected to supply certain loads in a similar manner as if they were selected to charge any recipient battery or battery bank. In a further example, if a load takes precedence over other loads, and the demand of the load can be sufficiently supplied with only selected donor batteries or battery banks, then the load may be serviced by the selected donor batteries or battery banks, without any charge supplied to or from potential recipient batteries or battery banks. Based on this further example, in a further embodiment, a system may be configured to transfer surplus charge from donor batteries or battery banks to lower-priority loads or recipient batteries or battery banks, during or after supplying a higher-priority load or battery or battery bank, for example.

FIG. 3 is a flowchart for a method 300 for selecting at least one donor battery bank from at any battery bank of a plurality of battery banks, according to some embodiments. Method 300 can be performed by processing logic that may comprise hardware (e.g., circuitry, dedicated logic, programmable logic, microcode, etc.), software (e.g., instructions executing on a processing device), or a combination thereof It is to be appreciated that not all steps may be needed to perform the enhanced techniques of the disclosure provided herein. Further, some of the steps may be performed simultaneously, or in a different order from that shown in FIG. 3, as will be understood by a person of ordinary skill in the art.

Method 300 shall be described with reference to FIGS. 1B-1D. However, method 300 is not limited to those example embodiments.

In 302, a processor such as processor 404 may identify batteries above or below a first threshold. Specifically, the first threshold may be a value of a parameter pertaining to the batteries, such as relative charge (to charge capacity), past discharge time, projected discharge time, past charge time, projected charge time, switching frequency (of charging source or discharging load), voltage, current, power input or output, temperature, or other parameters, to name a few non-limiting examples.

This identification may involve comparing corresponding values of all available batteries to the first threshold value, in some embodiments, or may instead involve processing a sorted list of the available batteries, for example. In some embodiments, this step may involve identifying batteries both above and below the threshold, inclusive or exclusive of the threshold value.

In some embodiments, the batteries may instead be battery banks. In other embodiments, the batteries may be representative of respective battery banks. In further embodiments, the batteries may be identified irrespective of any battery bank to which they may belong, for example. Examples include various embodiments of battery banks 111.

In 304, based on the first threshold and based on an algorithm, processor 404 may determine a first set of batteries from which a first battery is to be selected. Similar to the example above involving four out of ten battery banks each having collective charge levels at greater than 90% of capacity, an example here may involve four out of ten batteries exceeding a threshold charge level—some embodiments may involve battery banks instead of batteries. Alternatively, the first set determined based on the first threshold and the algorithm may involve batteries or battery banks having values below the threshold instead of above the threshold. A comparable example includes the above-mentioned three battery banks each having a collective charge level of less than 50%, according to an embodiment.

Thus, the first threshold mentioned in 302 and 304 may be a criterion for specifying donor or recipient batteries (or battery banks), for example. The algorithm may be any of a round-robin algorithm, balancing algorithm, pseudo-random algorithm, statistical algorithm or other comparable methodical or systematic way of load balancing, for example, for individual batteries among the collective batteries in the first set.

In 306, a processor such as processor 404 may identify batteries above or below a second threshold. Specifically, the second threshold may be a value of a parameter pertaining to the batteries, such as relative charge (to charge capacity), past discharge time, projected discharge time, past charge time, projected charge time, switching frequency (of charging source or discharging load), voltage, current, power input or output, temperature, or other parameters, to name a few non-limiting examples.

This identification may involve comparing corresponding values of all available batteries to the second threshold value, in some embodiments, or may instead involve processing a sorted list of the available batteries, for example. In some embodiments, this step may involve identifying batteries both above and below the threshold, inclusive or exclusive of the threshold value.

In some embodiments, the batteries may instead be battery banks. In other embodiments, the batteries may be representative of respective battery banks. In further embodiments, the batteries may be identified irrespective of any battery bank to which they may belong, for example. Examples include various embodiments of battery banks 111.

In 308, based on the second threshold and based on an algorithm, processor 404 may determine a second set of batteries from which a second battery is to be selected. The second set determined based on the second threshold and the algorithm may involve batteries or battery banks having values below the threshold instead of above the threshold. A similar example includes the above-mentioned three battery banks each having a collective charge level of less than 50%, according to an embodiment. Alternatively, like the example above involving four out of ten battery banks each having collective charge levels at greater than 90% of capacity, an example here may involve four out of ten batteries exceeding a threshold charge level—some embodiments may involve battery banks instead of batteries.

Thus, the second threshold mentioned in 306 and 308 may be a criterion for specifying donor or recipient batteries (or battery banks), for example. The algorithm may be any of a round-robin algorithm, balancing algorithm, pseudo-random algorithm, statistical algorithm or other comparable methodical or systematic way of load balancing, for example, for individual batteries among the collective batteries in the second set. The algorithm in 308 may be the same algorithm as in 304, in some embodiments. Alternatively, the algorithm in 308 may be different from the algorithm in 304, in whole or in part.

In 310, processor 404 may perform a charge transfer between the first battery and the second battery. This charge transfer may involve transfer of charge from the first battery to the second battery or vice-versa, depending on which battery is the donor or the recipient, for example. Other factors that may influence or determine the direction of the charge transfer may be the algorithm(s) involved in method 300 and/or any actual values or thresholds applied, in some embodiments.

Although this non-limiting example is described with reference to batteries specifically, batteries may instead be battery banks, representative of battery banks, or independent of any battery banks to which the batteries may belong. Alternatively, one of the batteries may instead be an energy source (power source) or a discharge load instead. In any of these cases, direction of charge flow may be more readily determined, such as from a source to a battery (bank) or from a battery (bank) to a discharge load, for example.

Method 300 is disclosed in the order shown above in this exemplary embodiment of FIG. 3. In practice, however, the operations disclosed above, alongside other operations, may be executed sequentially in any order, or they may alternatively be executed concurrently, with more than one operation being performed simultaneously, or any combination of the above. Additionally or alternatively, any simultaneous, concurrent, or sequential operations may be performed simultaneously, concurrently, and/or sequentially, and independently of or dependently on any other operation(s) that may be running elsewhere, for example.

Figure 4:
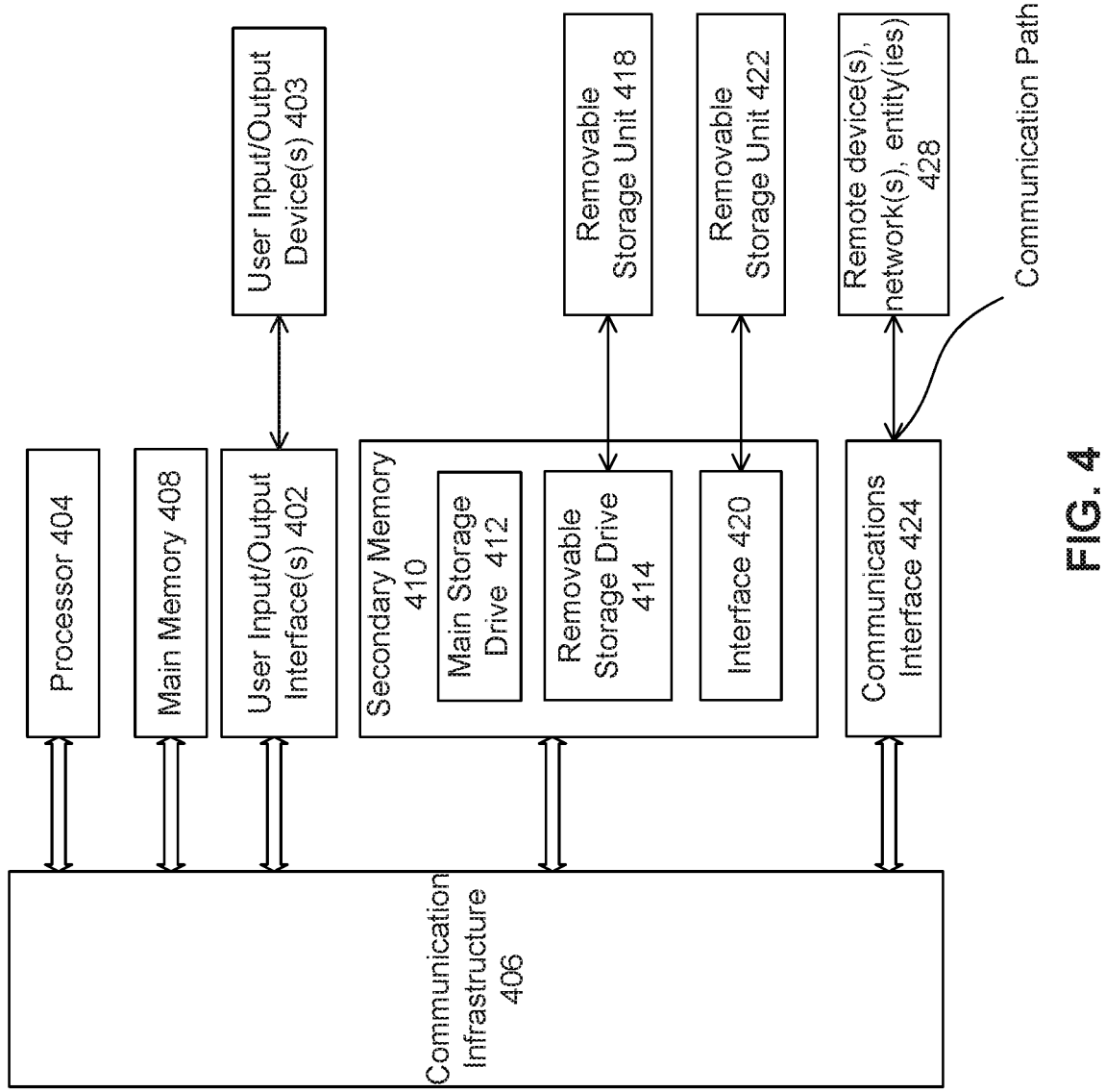
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof Computer system 400 may include one or more processors (also called central processing units, or CPUs), such as a processor 404. Processor 404 may be connected to a communication infrastructure or bus 406.

Computer system 400 may include one or more processors (also called central processing units, or CPUs), such as a processor 404. Processor 404 may be connected to a bus or communication infrastructure 406.

Computer system 400 may also include user input/output device(s) 403, such as monitors, keyboards, pointing devices, etc., which may communicate with communication infrastructure 406 through user input/output interface(s) 402.

One or more processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example.

Additionally, one or more of processors 404 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or secondary memory 410. Secondary memory 410 may include, for example, a main storage drive 412 and/or a removable storage device or drive 414. Main storage drive 412 may be a hard disk drive or solid-state drive, for example. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communication path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof It should be appreciated that the framework described herein may be implemented as a method, process, apparatus, system, or article of manufacture such as a non-transitory computer-readable medium or device. For illustration purposes, the present framework may be described in the context of distributed ledgers, including blockchain uses.

Computer system 400 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be assembled, compiled, or interpreted. Non-limiting examples include assembly language for any given controller or processor architecture, C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the information contained in this disclosure, it will be apparent to persons skilled in the relevant art(s) how to make and use embodiments of this disclosure using data processing devices, computer systems and/or computer architectures other than that shown in FIG. 4. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

We claim:

1. A computer-implemented method of battery charge management, the method comprising:
   determining, using at least one processor, that a charging rate of at least one first battery has transitioned from above a charging rate threshold to below the charging rate threshold and that the at least one first battery is at a partial state of charge,
      wherein the at least one first battery is associated with a first battery bank coupled to an external power source, and
      wherein the at least one first battery is rechargeable; and
   charging, in response to receipt of a command issued from the at least one processor or another processor as a result of the determining, the at least one first battery, using at least one second battery,
      wherein the at least one second battery belongs to a second battery bank, coupled to the external power source, that is not the first battery bank,
      wherein the charging comprises transferring charge from the at least one second battery to the at least one first battery, and
      wherein, in response to a power input from the external power source being above a first threshold or a discharge load on the at least one second battery being above a second threshold, the charging is not performed.

2. The method of claim 1, wherein the external power source is configured to charge the at least one first battery, and
wherein the command is issued in response to a decrease in power from the external power source.

3. The method of claim 1, wherein the external power source is configured to operate off-grid and comprises at least one of a photovoltaic cell, a turbine, a dynamo, and an engine generator.

4. The method of claim 1, wherein the second threshold comprises a predetermined value of load, a predetermined load-to-charge ratio of the at least one second battery, an estimated discharge time of the at least one second battery, or a combination thereof.

5. The method of claim 1, wherein of the first threshold, the second threshold, or a combination thereof, is dynamically adjusted based on a charge level of the at least one first battery.

6. The method of claim 1, further comprising:
selecting, using the at least one processor, a third battery belonging to a third battery bank that is not the second battery bank; and
performing, using the at least one processor, a charge transfer between the third battery and a fourth battery, wherein the fourth battery belongs to one of the first battery bank, the second battery bank, or the third battery bank, wherein the first battery bank, the second battery bank, and the third battery bank each comprises a plurality of batteries.

7. The method of claim 6, wherein the selecting is performed according to an algorithm, and wherein the algorithm comprises a round-robin algorithm, a pseudo-random algorithm, a balancing algorithm, a statistical algorithm, a charge-based algorithm, a frequency-based algorithm, a time-based algorithm, a capacity-based algorithm, a voltage-based algorithm, or a combination thereof.

8. The method of claim 7, wherein the charge transfer between the third battery and the fourth battery comprises transferring charge from the third battery to the fourth battery or transferring charge from the fourth battery to the third battery.

9. The method of claim 1, wherein the at least one first battery comprises at least one of a lead-acid battery, lithium-ion battery, sodium-ion battery, potassium-ion battery, nickel-based battery, polymer-based battery, polysulfide bromide battery, silver-oxide battery, metal-air battery, silicon-air battery, glass battery, vanadium redox battery, vanadium flow battery, organic radical battery, and rechargeable fuel cell.

10. A battery management system (BMS) comprising one or more processors and memory storing instructions causing the one or more processors to perform operations comprising:
determining that a charging rate of at least one first battery has transitioned from above a charging rate threshold to below the charging rate threshold and that the at least one first battery is at a partial state of charge,
wherein the at least one first battery is associated with a first battery bank coupled to an external power source, and
wherein the at least one first battery is rechargeable; and
charging, in response to receipt of a command issued from the one or more processors or another processor as a result of the determining, the at least one first battery, using at least one second battery,
wherein the at least one second battery belongs to a second battery bank, coupled to the external power source, that is not the first battery bank,
wherein the charging comprises transferring charge from the at least one second battery to the at least one first battery, and
wherein, in response to a power input from the external power source being above a first threshold or a discharge load on the at least one second battery being above a second threshold, the charging is not performed.

11. The BMS of claim 10, wherein the external power source is configured to charge the at least one first battery, and
wherein the command is issued in response to a decrease in power from the external power source.

12. The BMS of claim 10, wherein the external power source is configured to operate off-grid and comprises at least one of a photovoltaic cell, a turbine, a dynamo, and an engine generator.

13. The BMS of claim 10, wherein the second threshold comprises a predetermined value of load, a predetermined load-to-charge ratio of the at least one second battery, an estimated discharge time of the at least one second battery, or a combination thereof.

14. The BMS of claim 10, wherein the first threshold, the second threshold, or a combination thereof, is dynamically adjusted based on a charge level of the at least one first battery.

15. The BMS of claim 10, the operations further comprising:
selecting a third battery belonging to a third battery bank that is not the second battery bank; and
performing a charge transfer between the third battery and a fourth battery, wherein the fourth battery belongs to one of the first battery bank, the second battery bank, or the third battery bank, wherein the first battery bank, the second battery bank, and the third battery bank each comprises a plurality of batteries.

16. The BMS of claim 15, wherein the selecting is performed according to an algorithm, and wherein the algorithm comprises a round-robin algorithm, a pseudo-random algorithm, a balancing algorithm, a statistical algorithm, a charge-based algorithm, a frequency-based algorithm, a time-based algorithm, a capacity-based algorithm, a voltage-based algorithm, or a combination thereof.

17. The BMS of claim 16, wherein the charge transfer between the third battery and the fourth battery comprises transferring charge from the third battery to the fourth battery or transferring charge from the fourth battery to the third battery.

18. The BMS of claim 10, wherein the at least one first battery comprises at least one of a lead-acid battery, lithium-ion battery, sodium-ion battery, potassium-ion battery, nickel-based battery, polymer-based battery, polysulfide bromide battery, silver-oxide battery, metal-air battery, silicon-air battery, glass battery, vanadium redox battery, vanadium flow battery, organic radical battery, and rechargeable fuel cell.

19. A non-transitory computer-readable storage medium storing instructions for execution by a computing system comprising one or more computing processors, causing the computing system to perform operations comprising:
determining that a charging rate of at least one first battery has transitioned from above a charging rate threshold to below the charging rate threshold and that the at least one first battery is at a partial state of charge,
  wherein the at least one first battery is associated with a first battery bank coupled to an external power source, and
  wherein the at least one first battery is rechargeable; and
charging, in response to receipt of a command issued from the one or more computing processors or another processor as a result of the determining, the at least one first battery, using at least one second battery,
  wherein the at least one second battery belongs to a second battery bank, coupled to the external power source, that is not the first battery bank,
  wherein the charging comprises transferring charge from the at least one second battery to the at least one first battery, and
  wherein, in response to a power input from the external power source being above a first threshold or a discharge load on the at least one second battery being above a second threshold, the charging is not performed.

20. The non-transitory computer-readable storage medium of claim 19, wherein the external power source is configured to charge the at least one first battery, and
  wherein the command is issued in response to a decrease in power from the external power source.

21. The non-transitory computer-readable storage medium of claim 19, wherein the external power source is configured to operate off-grid and comprises at least one of a photovoltaic cell, a turbine, a dynamo, and an engine generator.

22. The non-transitory computer-readable storage medium of claim 19, wherein the second threshold comprises a predetermined value of load, a predetermined load-to-charge ratio of the at least one second battery, an estimated discharge time of the at least one second battery, or a combination thereof.

23. The non-transitory computer-readable storage medium of claim 19, wherein at least one of the first threshold and/or the second threshold is dynamically adjusted based on a charge level of the at least one first battery.

24. The non-transitory computer-readable storage medium of claim 19, the operations further comprising:
  selecting a third battery belonging to a third battery bank that is not the second battery bank; and
  performing a charge transfer between the third battery and a fourth battery, wherein the fourth battery belongs to one of the first battery bank, the second battery bank, or the third battery bank, wherein the first battery bank, the second battery bank, and the third battery bank each comprises a plurality of batteries.

25. The non-transitory computer-readable storage medium of claim 24, wherein the selecting is performed according to an algorithm, and wherein the algorithm comprises a round-robin algorithm, a pseudo-random algorithm, a balancing algorithm, a statistical algorithm, a charge-based algorithm, a frequency-based algorithm, a time-based algorithm, a capacity-based algorithm, a voltage-based algorithm, or a combination thereof.

26. The non-transitory computer-readable storage medium of claim 25, wherein the charge transfer between the third battery and the fourth battery comprises transferring charge from the third battery to the fourth battery or transferring charge from the fourth battery to the third battery.

27. The non-transitory computer-readable storage medium of claim 19, wherein the at least one first battery comprises at least one of a lead-acid battery, lithium-ion battery, sodium-ion battery, potassium-ion battery, nickel-based battery, polymer-based battery, polysulfide bromide battery, silver-oxide battery, metal-air battery, silicon-air battery, glass battery, vanadium redox battery, vanadium flow battery, organic radical battery, and rechargeable fuel cell.

* * * * *